March 26, 1963 L. R. HAGNER ET AL 3,082,859
MECHANISM FOR INTERMITTENTLY ADVANCING AND POSITIONING ARTICLES
Filed Dec. 5, 1960 3 Sheets-Sheet 2
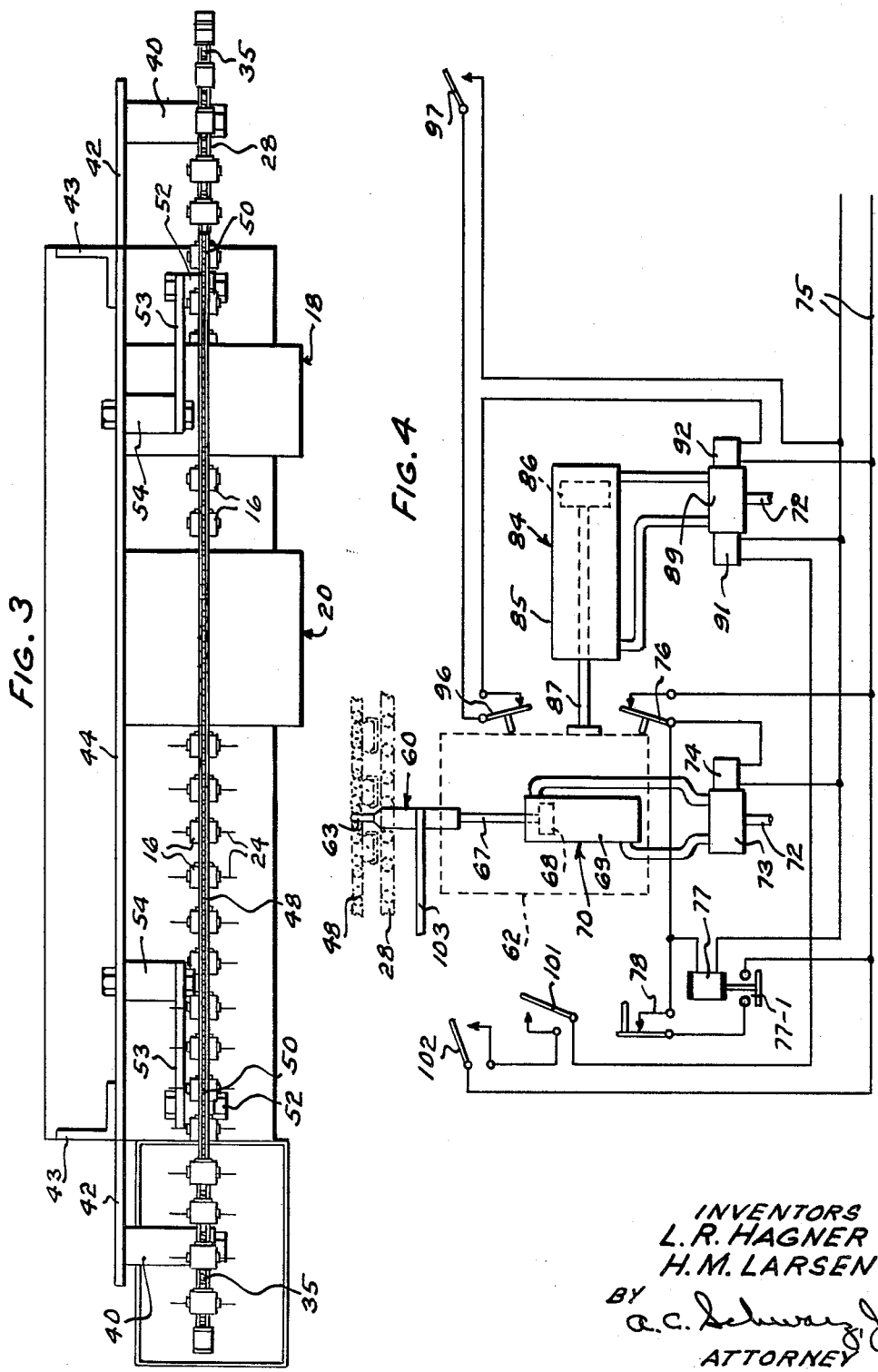
INVENTORS
L. R. HAGNER
H. M. LARSEN
BY
A. C. Schwarz Jr.
ATTORNEY

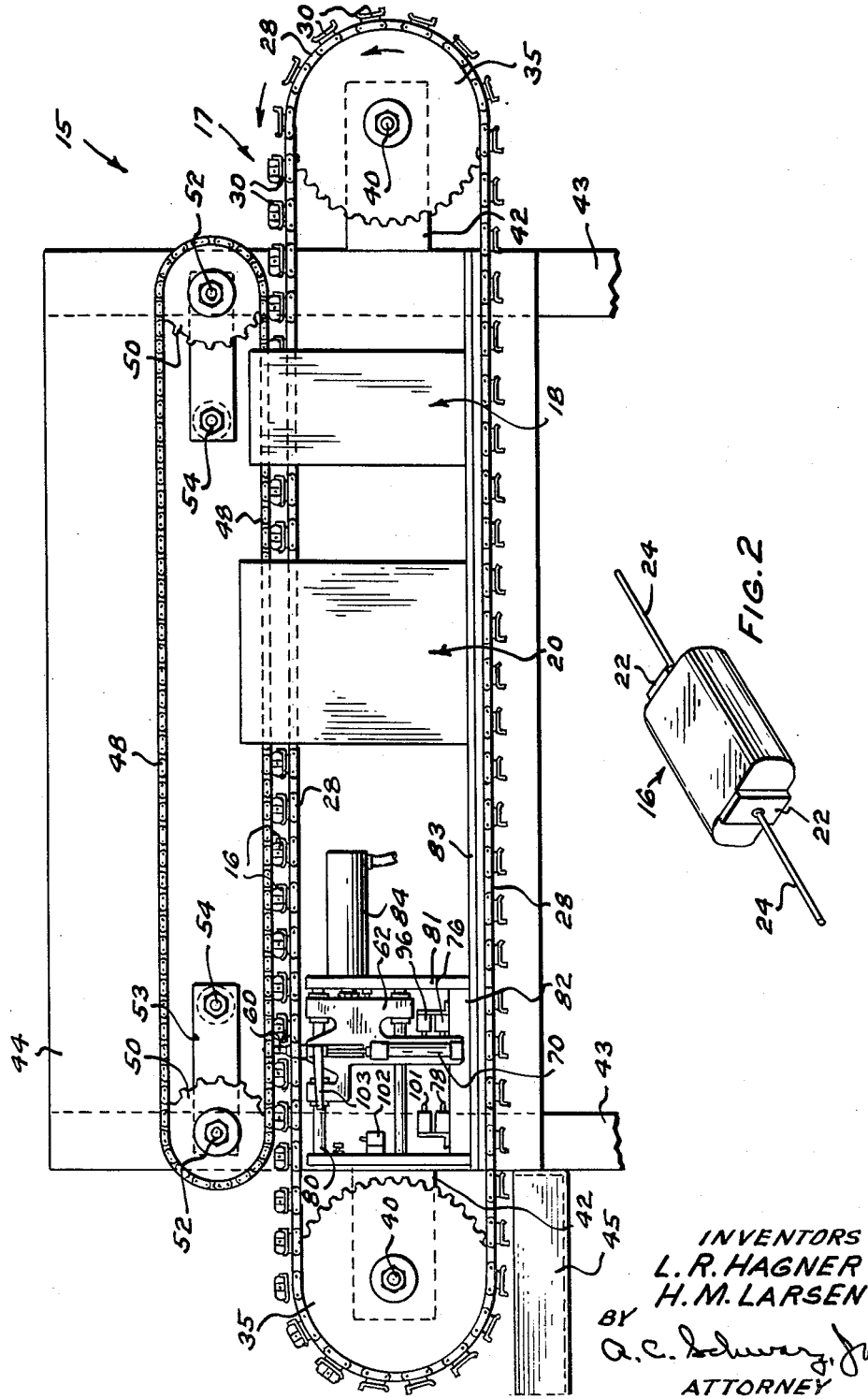

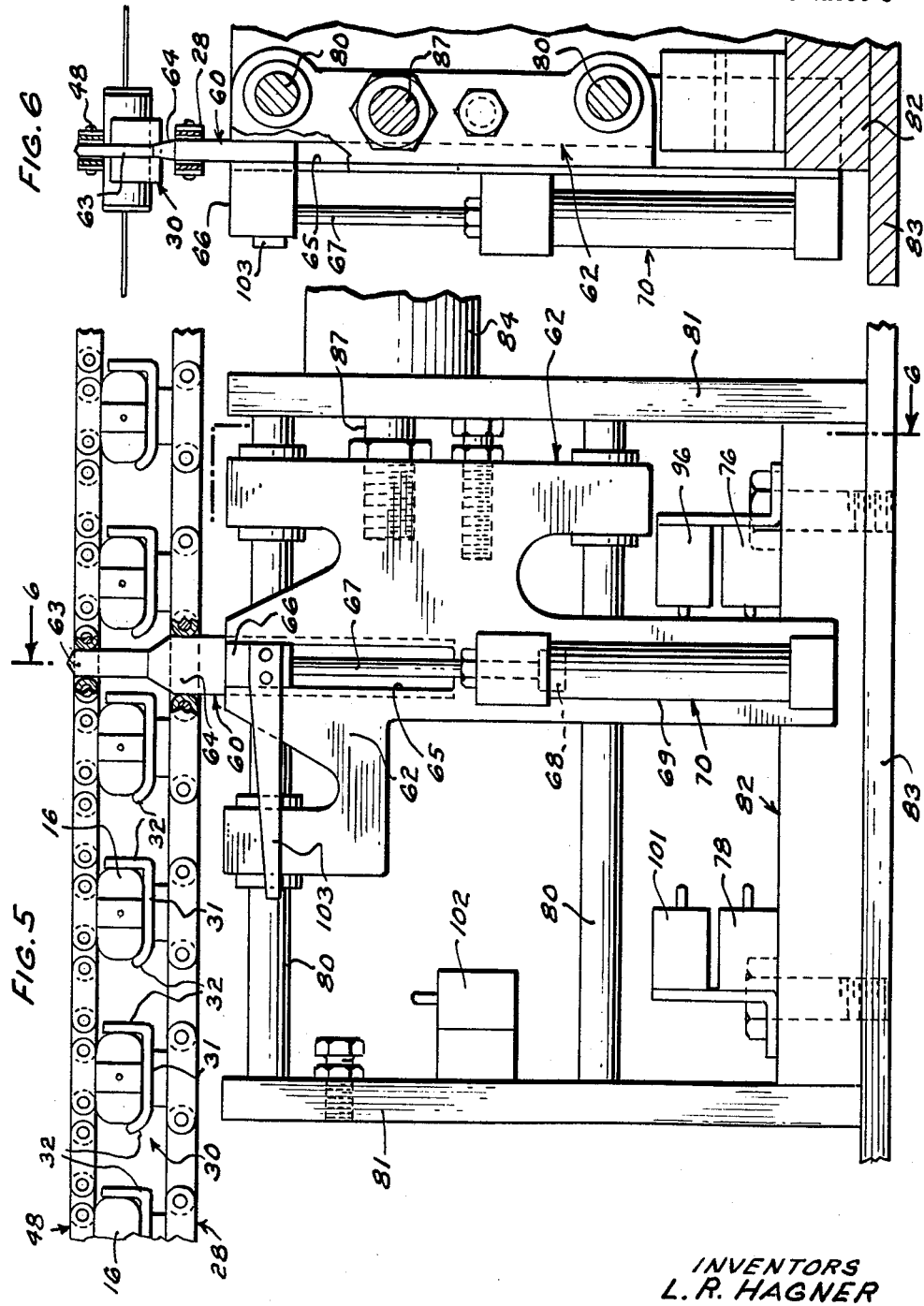

United States Patent Office 3,082,859
Patented Mar. 26, 1963

3,082,859
MECHANISM FOR INTERMITTENTLY ADVANCING AND POSITIONING ARTICLES
Lawrence R. Hagner, Cicero, Ill., and Henry M. Larsen, Estherville, Iowa, assignors to Western Electric Company, Incorporated, a corporation of New York
Filed Dec. 5, 1960, Ser. No. 73,628
2 Claims. (Cl. 198—135)

This invention relates to mechanism for intermittently advancing and positioning articles, and more particularly to mechanism for holding articles in accurately spaced relation to each other and for intermittently advancing and accurately positioning the articles in a work station.

An object of the invention is to provide an improved mechanism for intermittently advancing and positioning articles.

Another object of the invention is to provide a novel mechanism for holding articles in accurately spaced relation to each other and for intermittently advancing and accurately positioning the articles in a work station.

With these and other objects in view, the invention contemplates the provision of a first endless chain conveyor having uniformly spaced seats thereon for receiving articles and guiding them along a substantially horizontal path through a work station. A second endless chain conveyor is supported by a pair of sprockets above the first conveyor, the sprockets being mounted for vertical floating movement to support the conveyor for free downward movement into engagement with the articles on the lower conveyor for securely holding the articles on the seats of the lower conveyor as the articles are advanced therewith to and are worked on at the work station. A connector element slidably mounted on a carriage is moved by a first actuator through aligned apertures in the adjacent portions of the upper and lower conveyors to connect the conveyors for movement together and the carriage is reciprocated by a second actuator through a distance corresponding to the spacing of the seats. Control means are provided for effecting the sequential operation of the two actuators and the connector element and the carriage associated therewith to obtain the intermittent advancement of the conveyors and the positioning of successive articles in the work station.

Other objects, advantages and novel aspects of the invention will become apparent upon consideration of the following detailed description, in conjunction with the accompanying drawings, in which:

FIG. 1 is a front elevational view of the article advancing mechanism embodying the present invention;

FIG. 2 is a perspective view of an article of the type advanced by the present mechanism;

FIG. 3 is a plan view of the article advancing mechanism;

FIG. 4 is a diagrammatic view of the electrical control for the mechanism;

FIG. 5 is an enlarged fragmentary side view of a portion of the article advancing mechanism; and FIG. 6 is a vertical cross sectional view of the mechanism taken on the line 6—6 of FIG. 5.

The present mechanism 15 is designed to receive successive articles 16 at a loading station 17 and to advance them intermittently along a predetermined path to and from a pair of work stations 18 and 20 and to accurately position the articles therein for work operations thereon. The articles 16 (FIG. 2) are in the form of wound capacitors having metal terminals 22 on the ends thereof to which headed wire leads 24 are attached.

The mechanism comprises a conveyor 28 in the form of an endless chain having seats 30 secured thereto in uniformly spaced relation to one another for receiving the articles 16 thereon. The seats 30 (FIG. 5) have flat portions 31 secured to the chain for supporting the articles and have upwardly extending portions 32 engageable with the sides of the article for locating the article in predetermined positions in accurately spaced relation to one another on the conveyor. The chain conveyor 28 is supported on a pair of sprockets 35 for movement therearound and with the upper traverse of the conveyor extending along a substantially horizontal path for advancing the articles 16 to the work stations 18 and 20. The sprockets 35 are supported for rotation on stub shafts 40 fixedly mounted on a horizontal member 42 which is secured to a pair of upright members 43 of a frame 44.

Mechanism is provided at the first work station 18 for cleaning the terminals 22 of the articles 16, and at the second work station 20 mechanism is provided for heating and attaching the headed wire leads 24 to the terminals 22. The position of the first and the second work stations are indicated diagrammatically herein but none of the mechanism at these stations has been illustrated inasmuch as it forms no part of the present invention.

Referring to FIG. 1 the articles 16 are applied to the seats 30 in the loading station adjacent one end of the conveyor 28 and move with the conveyor in the direction of the arrow through stations 18 and 20. On reaching the lefthand end of the conveyor 28 the articles drop from the seats 30 into a suitable receptacle 45 provided therefore as the seats 30 move downwardly with the conveyor 28 around the sprocket 35.

An auxiliary hold-down conveyor 48 in the form of an endless chain is provided above the lower conveyor 28 for engaging successive articles 16 and holding them firmly in position on the seats 30 as the articles are advanced by the conveyor to the several stations and while work is performed thereon at such stations. The conveyor 48 is supported on a pair of spaced sprockets 50 for movement therearound. The sprockets 50 are rotatably supported on stub shafts 52 which are individually mounted on one end of a pair of arms 53. At the other ends thereof the arms 53 are pivotally mounted on studs 54 fixedly secured to the frame 44. From an inspection of FIG. 1 it will be seen that the sprockets 50 and the conveyor 48 are floatingly mounted for free vertical movement so that the upper conveyor 48 rests upon the articles 16 on the lower conveyor 28 and serves to hold them firmly in place on the seats 30 as they advance with the conveyor 28 and while they are operated upon at the work stations.

Because the articles 16 are fragile and may be readily damaged it is essential that the conveyors 28 and 48 be advanced simultaneously to prevent relative movement therebetween and possible damage to the articles. For this purpose a vertically movable connector element 60 is provided for effecting an intermittent driving connection between the conveyors. The connector element 60 which is carried by a horizontally movable carriage 62 has an end portion 63 slidable through openings in the chain conveyor 28 into apertures in the chain conveyor 48 for effecting a driving connection therewith, and has an enlarged portion 64 engageable in the apertures of the conveyor chain 28 for effecting a driving connection therewith. The connector element 60 is mounted for vertical movement in a slideway 65 on the carriage 62 and has a laterally extending portion 66 (FIG. 6) to which a piston rod 67 is secured. The rod 67 is attached to a piston 68 within a cylinder 69 of a fluid operated actuator 70 secured to the carriage 62.

Reciprocation is imparted to the piston 68 by compressed air flowed into opposite ends of the actuator 70 from a supply line 72 (FIG. 4) under control of a valve 73. The valve 73 is spring urged to a normal position in which the compressed air is admitted to the upper end of the cylinder 70 to effect the movement of the connector element 60 to retracted position in disengaged relation to the conveyors 28 and 48. The valve 73 is shifted to its other position by a solenoid 74 in response to energization thereof to effect the upward movement of the connector element 60 into engagement with the conveyors.

The solenoid 74 is connected to power lines 75 in series with a normally open switch 76 which is actuated to closed position in response to movement of the carriage 62 to its retracted position (FIGS. 1, 4 and 5). The closing of switch 76 effects the energization of the solenoid 74 and the operation of the actuator 70 to raise the connector element 60 to its upper position thereby interconnecting the conveyors 28 and 48 for movement together. The closing of the switch 76 also completes a circuit to and energizes a relay 77 in parallel with the solenoid 74. In response to energization of the relay 77, relay contacts 77–1 are closed to complete an auxiliary circuit through the relay contacts and a normally closed switch 78. This locks in the relay 77 and connects the solenoid 74 to the power lines 75 to insure the energization of the solenoid and the maintenance of the connector element 60 in engagement with the conveyors 28 and 48 when the switch 76 returns to its open position as the carriage 62 moves forward from its retracted position.

The carriage 62 is slidably mounted for horizontal movement on a pair of guide rods 80 (FIGS. 5 and 6) which are secured at their ends to a pair of vertical supporting plates 81 of a supporting bracket 82 fixed to a horizontal frame member 83. Horizontal reciprocation is imparted to the carriage 62 by a fluid operated actuator 84 which is secured to a vertical plate 81. The actuator 84 has a cylinder 85 with a piston 86 reciprocable therein and connected by means of a piston rod 87 to the carriage 62. Air from the supply line 72 is admitted to opposite ends of the cylinder 85 under control of a valve 89 which is shifted from one position to another by solenoids 91 and 92 in response to selective energization thereof, the valve remaining in one position until it is shifted to the other position.

The solenoid 92 is connected to power lines 75 in series with a pair of normally open switches 96 and 97. The switch 96 is suitably mounted on the frame for actuation to closed position by the movement of the carrier 62 to its retracted position. The switch 97 is located at one of the work stations and is actuated to closed position on completion of successive work cycles.

The carriage 62 is in its retracted position and the connector element 60 is in engagement with the conveyors 28 and 48 while work is being performed on the articles 16 at the work stations 18 and 20. On completion of the work operation, the switch 97 is actuated to closed position to complete a circuit to and effect the energization of the solenoid 92 and the shifting of the valve 89 in response to which the actuator 84 advances the carriage 62 and the conveyors 28 and 48 through a predetermined distance to carry a pair of articles from the work stations and to advance and accurately locate another pair of articles therein.

As the carriage 62 arrives at its forward position, it opens the switch 78 and closes a normally open switch 101. The opening of the switch 78 effects the deenergization of the solenoid 74 and the downward movement of the connector element 60 to its lower position disengaged from the conveyors 28 and 48. In response to downward movement of the connector element 60 to its lower position an arm 103 on the connector element closes the switch 102. A circuit is thereby completed through switches 102, 101 to the solenoid 91 effecting its energization and the shifting of the valve 89 resulting in the return movement of the carriage 62 to its retracted position. This in turn effects the closing of the switch 76 and results in the energization of the solenoid 74 and the raising of the connector element 60 to its upper position in engagement with the conveyors 28 and 48 preparatory to the initiation of the succeeding cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Mechanism for intermittently advancing and accurately positioning articles in a work station comprising support means, a lower endless conveyor mounted on said support means and having uniformly spaced seats thereon for supporting articles for movement along a predetermined path, an upper endless conveyor, a pair of rotary members for supporting said upper conveyor for movement therearound and above and in substantially parallel relation to said lower conveyor, means on said support means for supporting said rotary members for rotation about their axes and for substantially vertical movement to guide said upper conveyor for downward movement into engagement with the articles to hold the articles onto the lower conveyor for movement therewith to the work station, said conveyors having aligned recesses in spaced relation to one another corresponding to the spacing of said seats, a carriage mounted on said support means for movement parallel to said path, a connector element mounted on said carriage for movement therewith and for movement relative thereto into the recesses of said conveyors for connecting said conveyors together for advancing movement, means on said carriage for moving said connector element into and out of engagement with said conveyors, and means for reciprocating said carriage.

2. Mechanism for intermittently advancing and accurately positioning articles in a work station comprising support means, a lower endless chain conveyor having uniformly spaced seats thereon for supporting articles, a pair of first rotary members mounted on said support means for rotation about fixed axes for supporting said lower conveyor in a position to advance said articles along a substantially horizontal path, an upper endless chain conveyor mounted above said lower conveyor, a pair of second rotary members for supporting said upper conveyor for movement therearound and in substantially parallel relation to said lower conveyor, means on said support means for supporting said second rotary members for rotation about their axes and for substantially vertical movement to guide said upper conveyor for downward movement into engagement with the articles to hold the articles onto the lower conveyor for movement therewith to the work station, said chain conveyors having aligned apertures therethrough in spaced relation to one another corresponding to the spacing of said seats, a carriage mounted on said support means for movement parallel to said path, a connector element mounted on said carriage for movement therewith parallel to said path and for movement relative thereto transversely of said path into the apertures of said conveyors for connecting said conveyors together for advancing movement, a fluid operated actuator on said carriage for moving said connector element into and out of engagement with said chain conveyors, a fluid operated actuator on said support means for reciprocating said carriage through a distance corresponding to the spacing of said seats, and means including a control element at said work station for effecting the sequential operation of said fluid actuators to effect the intermittent advancement of said conveyors and the feeding of successive articles into the work station.

References Cited in the file of this patent

UNITED STATES PATENTS

| | | |
|---|---|---|
| 1,648,749 | Udstad | Nov. 8, 1927 |
| 2,529,777 | McInnis | Nov. 14, 1950 |
| 2,586,630 | Erland | Feb. 19, 1952 |
| 2,825,442 | Carter | Mar. 4, 1958 |
| 2,996,169 | Gentry | Aug. 15, 1961 |